(No Model.)
J. J. DEAL.
PERMUTATION PADLOCK.
No. 531,676. Patented Jan. 1, 1895.
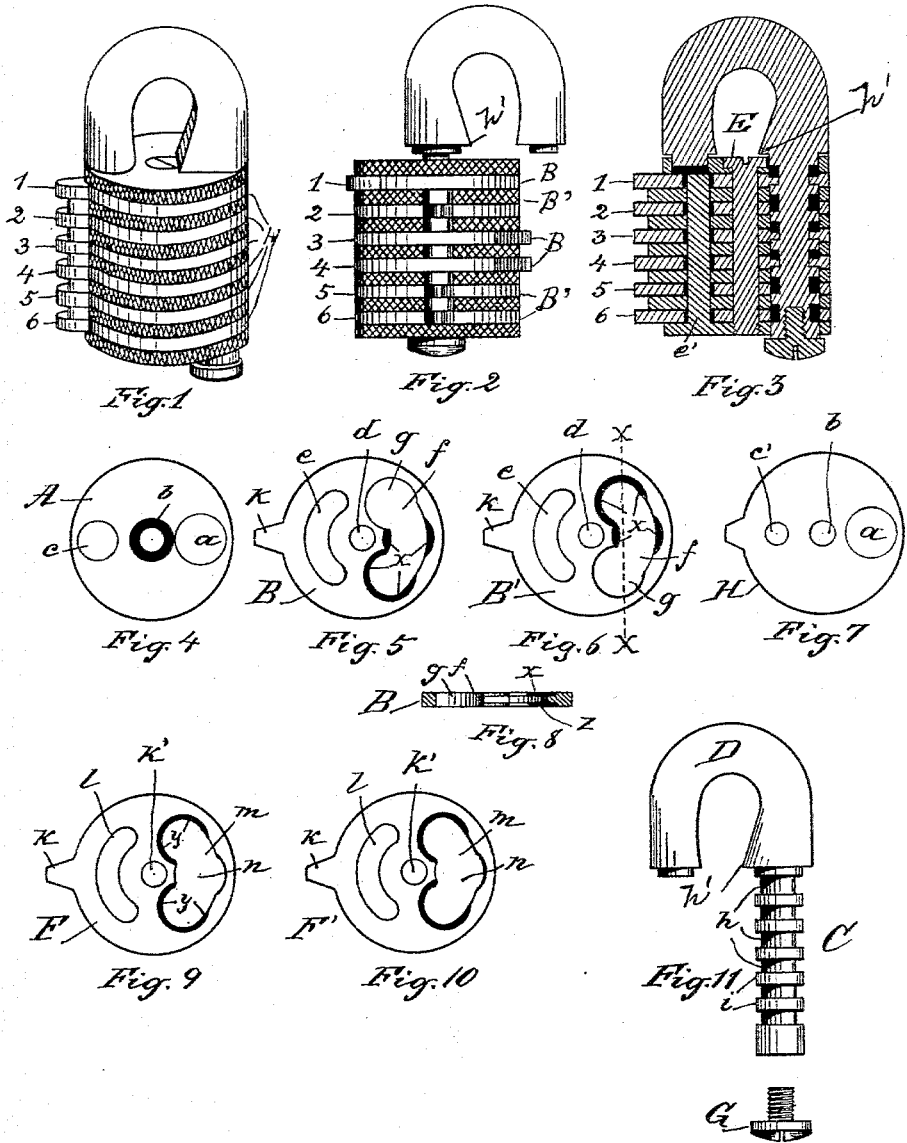
WITNESSES
Theo. Hiller
Burt ?. Miller
INVENTOR
Josiah J. Deal
By W. K. Miller
Attorney

UNITED STATES PATENT OFFICE.

JOSIAH J. DEAL, OF CANTON, OHIO.

PERMUTATION-PADLOCK.

SPECIFICATION forming part of Letters Patent No. 531,676, dated January 1, 1895.

Application filed March 7, 1894. Serial No. 502,729. (No model.)

*To all whom it may concern:*

Be it known that I, JOSIAH J. DEAL, a citizen of the United States, and a resident of Canton, county of Stark, State of Ohio, have invented a new and useful Improvement in Permutation-Locks, of which the following is a full, clear, and exact description, reference being had to the accompanying drawings, making part of this specification.

My invention relates to improvements in permutation locks, and consists of certain features of construction and combination of parts as will be hereinafter described and claimed.

For the purposes of this specification I have shown my invention as applied to a padlock, but the invention may be used in other forms of lock without material alteration.

Figure 1 of the accompanying drawings is a view in perspective, showing my invention in padlock form and in a locked position. Fig. 2, is a side view showing the unlocked position. Fig. 3, is a longitudinal section showing parts in locked position. Fig. 4, is a plan view of the upper end disk. Fig. 5, is a similar view of one of the locking disks. Fig. 6, a similar view of the reverse or opposite side of that shown in Fig. 5. Fig. 7, is a similar view of a spacing disk. Fig. 8, is a sectional view through locking disk shown in Fig. 6, on a line indicated by the dotted line $x\,x$. Fig. 9, is a plan view of a locking disk. Fig. 10, is a similar view of the opposite or reverse side of that shown in Fig. 9, and Fig. 11, is a side view of the shackle.

The lower end disk is similar to the spacing disk shown in Fig. 7, with the nib removed.

For the purposes of this specification I have shown a lock construction in which is used six locking disks, three of which are of the form shown in Figs. 5 and 6, and three of the form shown in Figs. 9 and 10, and five of the spacing disks shown in Fig. 7, and held in operative position between the end disks by a bolt.

The end disk A is of the form shown in Fig. 4, having an aperture as $a$ through which is passed the shank of the shackle, a countersunk aperture $b$ to receive the bolt E, and an aperture $c$ to receive the end portion of the shackle.

B represents one of a series of locking disks and is of the form shown in Figs. 5 and 6, having therein a central aperture $d$, to receive the bolt E, a curved elongated aperture $e$ to receive the pin $e'$, and a curved elongated aperture $f$ having one of its ends $g$ enlarged to admit of the free passage of the shank portion C, of the shackle D, the other end smaller and adapted to that portion $h$ of the shank between the collars $i$. The outer edges of the disk about the aperture, are cut away at $x$, to form a tongue portion $z$ as shown in Fig. 8, the tongue portion to pass into the space or grooves $h$ between the collars $i$. The object sought in cutting away the sides of the plate about the aperture $f$, is to avoid friction and to allow the disk to enter the grooves $h$ freely, and to provide for a slight end movement of the shackle shown in Fig. 3, a nib as $k$ is formed at the outer edge of the disk by which it is rotated about the center bolt E.

The disk B' shown in Fig. 6, is simply the reverse or opposite side of that shown in Fig. 5, and hereinbefore described, the dotted line X X showing the section line of Fig. 8.

F represents one of a second series of locking disks and is of the form shown in Fig. 9, having a central aperture $k'$ to receive the bolt E and a curved elongated aperature $l$ to receive the pin $e'$, and a curved aperture $m$ having circular ends the edges $y$ cut away to form a tongue $z$ as shown in Fig. 8, by which the end portions of the aperture are reduced or adapted to that portion of the shank of the shackle, between the collars, to form a tongue similar to the tongue $z$ as shown in Fig. 8. The central portion of the slot is enlarged to receive and allow the shank of the shackle to pass into the lock. The nib $k$ similar to that on disk B is provided to move the disk about the pin E. Disk F shown in Fig. 10, is the reverse or opposite side of that shown in Fig. 9, and herein described.

The shackle D is of the form shown in Fig. 11, having a hook or staple portion, one end of which is adapted to enter the aperture $c$, provided in disk A, the other end terminating in a shank C, having a series of alternating collars $i$, and grooves $h$, and to secure the shank in the lock, a screw as G is provided, that may be turned into a threaded perforation, in the end of the shank, the head of the screw to be larger than the apertures $a$ in the end disks A and H. The spacing disks are similar to that shown in Fig. 7, having a perforation as $a$ for the shank of the shackle $b$, for the screw bolt E, and a perforation $c'$, for the pin $e'$.

To assemble the parts to form the lock herein shown and described, the pin $e'$, is placed in perforation $c'$, in the disk H, on which are placed alternately the locking disks and spacing disks. The bolt E is placed in the central apertures, the threaded end turned into the threaded aperture $b$. The disks are then turned to bring the apertures $a$, $f$ and $n$ in register, the nibs $k$ all in line as shown in Fig. 1. The shackle is then passed into and through the aperture, thus provided, the shoulder $h'$ of the shackle resting over the head of the bolt E; and the screw G turned into the end as shown in Fig. 3, whereby the removal of the bolt is prevented when the shackle is locked in, and the shackle head in the lock when unlocked.

The lock as shown is set on the locking disks B, constructed as shown in Figs. 5 and 6. B is indicated as 1 in the lock with the face shown up or toward the staple portion of the shackle. B' is indicated as 3 and 4 in the lock, the side shown facing the shackle, which is simply disk B turned over. The remaining disks 3, 5 and 6 are represented as F in Fig. 9. When the nibs $k$ are in line as shown in Fig. 1, the middle or small portion of the curved aperture $f$ with flanges $x$ in the grooves $h$, the central or large portion $n$ of the aperture in disks F, registering with the middle portion of the aperture in disk B and B'. To unlock the shackle, turn the nib $k$ of disk B or number 1, to the left to carry the narrow portion of the aperture out of the groove in the shank of the shackle, and the nibs or disks 3 and 4, to the right as shown in Fig. 2, which will bring the large portion of all the disks in register to release the shank portion of the shackle, which may then be moved endwise a distance to remove the end portion out of the perforation $c$, so that it may be turned to the opposite side and removed or released from whatever it may have been locked on.

The disks may be arranged to form many combinations.

Having thus fully described the nature and object of my invention, what I claim is—

1. The combination in a permutation lock of the shackle D, having alternate grooves $h$ and collars $i$, of the locking disks B, having a central perforation $d$, an elongated curved aperture $e$, at one side of the central perforation, and at the other side an elongated curved aperture, one end of which is enlarged to admit the free passage of the shank of the shackle, the central and the other end portion contracted by the inwardly projected tongue $z$, and the locking disks F, having a central perforation $k'$ and an elongated curved aperture at one side of the central perforation, having the central portion enlarged to admit the free passage of the shank of the shackle, the end portions contracted by the inwardly projected tongue $y$, spacing disks H, pin $e'$ and the clamping bolt E, substantially as described and for the purpose set forth.

2. The combination in a permutation lock of the shackle D, having a shank portion C provided with a series of grooves $h$, of locking disks having a central aperture $d$, a curved aperture $e$ a curved elongated aperture $f$, having one of its end portions enlarged to receive the shank of the shackle, the other end adapted to that portion of the shank between the collars, substantially as and for the purpose set forth.

In testimony whereof I have hereunto set my hand this 16th day of February, A. D. 1894.

JOSIAH J. DEAL.

Witnesses:
W. K. MILLER,
BURT A. MILLER.